(12) United States Patent
Chatani et al.

(10) Patent No.: US 8,671,362 B2
(45) Date of Patent: Mar. 11, 2014

(54) CONTENT AND/OR SERVICE PRESENTATION DEVICE AND METHOD AND INFORMATION STORAGE MEDIUM

(75) Inventors: Masayuki Chatani, Tokyo (JP);
Hirotoshi Maegawa, Tokyo (JP);
Takayuki Ishida, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 934 days.

(21) Appl. No.: 12/160,950

(22) PCT Filed: Jan. 16, 2007

(86) PCT No.: PCT/JP2007/050529
§ 371 (c)(1),
(2), (4) Date: Aug. 13, 2008

(87) PCT Pub. No.: WO2007/081028
PCT Pub. Date: Jul. 19, 2007

(65) Prior Publication Data
US 2010/0185964 A1     Jul. 22, 2010

(30) Foreign Application Priority Data
Jan. 16, 2006  (JP) .................................. 2006-008087

(51) Int. Cl.
*G06F 3/048* (2013.01)

(52) U.S. Cl.
USPC ........... 715/850; 715/764; 715/811; 715/838; 715/781

(58) Field of Classification Search
USPC ......... 715/768, 708, 764, 781, 810–812, 835, 715/838, 850
See application file for complete search history.

(56) References Cited

U.S. PATENT DOCUMENTS

| | | | | |
|---|---|---|---|---|
| 7,590,948 B2* | 9/2009 | Narita et al. | ................... | 715/810 |
| 8,255,815 B2* | 8/2012 | Ording | ........................ | 715/764 |
| 8,261,209 B2* | 9/2012 | Goto et al. | .................... | 715/838 |
| 2004/0221308 A1* | 11/2004 | Cuttner et al. | .................. | 725/46 |
| 2005/0193414 A1* | 9/2005 | Horvitz et al. | .................. | 725/46 |
| 2008/0097970 A1* | 4/2008 | Olstad et al. | ..................... | 707/3 |

FOREIGN PATENT DOCUMENTS

| | | |
|---|---|---|
| JP | 2004023118 A | 1/2004 |
| JP | 2005094355 A | 4/2005 |
| JP | 2005332084 A | 12/2005 |
| JP | 200612149 A | 1/2006 |

OTHER PUBLICATIONS

International Search Report for PCT application PCT/JP2007/050529.
International Preliminary Report on Patentability for PCT application PCT/JP2007/050529.
Notice of Rejection for corresponding Japanese Patent Application No. 2007-553987, Jun. 29, 2010 (and Partial translation).

* cited by examiner

*Primary Examiner* — Weilun Lo
*Assistant Examiner* — Dino Kujundzic
(74) *Attorney, Agent, or Firm* — Matthew B. Dernier, Esq.; Gibson & Dernier LLP (57) ABSTRACT

To effectively arouse a user's interest in new content and service, or content and service not used on a daily basis. Images of a plurality of display elements associated with respective content sets and/or service are shown; one or more display elements are selected, based on a designated position designated by a user; and content and/or a service associated with the selected display element is presented. In the above, presentation of the content and/or service is made in a different manner according to information about the provider thereof or the user.

19 Claims, 6 Drawing Sheets

| c-id | | | 0001 | |
|---|---|---|---|---|
| URL | | | http://xx1 | |
| PRESENTATION AND MAIN PART HISTORY | MANNER OF PRESENTATION | | PRESENTATION FREQUENCY | MAIN PART FREQUENCY |
| | STATIC IMAGE | | 1 | 0 |
| | MOTION IMAGE | | 1 | 0 |
| | CHAT PROMPT | | 8 | 6 |

| MANNER OF PRESENTATION | | | MAIN PART | TIME |
|---|---|---|---|---|
| STATIC IMAGE | MOTION IMAGE | CHAT PROMPT | | |
| 1 | 0 | 0 | 0 | 2006/11/11 12:00:12 |
| 0 | 0 | 1 | 1 | 2006/11/12 09:03:52 |
| 0 | 0 | 1 | 1 | 2006/11/30 13:01:00 |
| 0 | 0 | 1 | 0 | 2006/11/30 18:03:03 |
| 0 | 1 | 0 | 0 | 2006/12/03 22:00:00 |
| : | : | : | : | : |

FIG. 11

| c-id | 0001 | | | | |
|---|---|---|---|---|---|
| u-id | MANNER OF PRESENTATION | | | MAIN PART | TIME |
| | STATIC IMAGE | MOTION IMAGE | CHAT PROMPT | | |
| 05005 | 1 | 0 | 0 | 0 | 2006/11/11 12:00:12 |
| 05005 | 0 | 0 | 1 | 1 | 2006/11/12 09:03:52 |
| 07005 | 1 | 0 | 0 | 1 | 2006/11/12 09:05:03 |
| 08015 | 0 | 1 | 0 | 0 | 2006/11/12 09:10:59 |
| : | | | | | |

FIG.12

CONTENT AND/OR SERVICE PRESENTATION DEVICE AND METHOD AND INFORMATION STORAGE MEDIUM

TECHNICAL FIELD

The present invention relates to a content and/or service presentation device and method, and an information storage medium.

BACKGROUND ART

As a content and/or service presenting user interface, there is known an interface for showing an icon representative of content and/or service on a screen or the name thereof in the form of a menu.

According to a conventional user interface, however, a user cannot know the contents of the content and/or service until a separate operation for using the content and/or service is actually carried out. Moreover, displaying the same icon and mere name of content and/or service all the time cannot effectively arouse a user's interest. As a result, new content and/or service or one not used on a daily basis cannot attract a user's interest, so that use of such content and/or service is not promoted.

The present invention has been conceived in view of the above, and aims to provide a content and/or service presentation device and method and an information storage medium for effectively arousing a user's interest in new content and service, or one not used on a daily basis.

SUMMARY OF THE INVENTION

In order to achieve the above described object, according to one aspect of the present invention, there is provided a content and/or service presentation device, comprising display means for displaying images of a plurality of display elements associated with respective content sets and/or services; display element selection means for selecting one or more display elements from among the plurality of display elements, according to user operation; information obtaining means for obtaining information about the user or a provider of content and/or service associated with the respective display element selected by the display element selection means; reading means for reading one presentation data item from among a plurality of kinds of presentation data stored in presentation data storage means so as to be associated with the respective display element selected by the display element selection means, the one presentation data item being selected based on the information obtained by the information obtaining means; and presentation means for presenting the content and/or service associated with the respective display element selected by the display element selection means, based on the presentation data read by the reading means.

According to another aspect of the present invention, there is provided a content and/or service presentation method, comprising a display step of displaying images of a plurality of display elements associated with respective content sets and/or services; a display element selection step of selecting one or more display elements from among the plurality of display elements, according to user operation; an information obtaining step of obtaining information about the user or a provider of content and/or service associated with the respective display element selected at the display element selection step; a reading step of reading, with reference to presentation data storage means for storing a plurality of kinds of presentation data for presenting content and/or service associated with each display element, so as to be associated with the respective display element, one presentation data item from among the plurality of kinds of presentation data stored in the presentation data storage means so as to be associated with the respective display element selected at the display element selection means, the one presentation data item being selected based on the information obtained at the information obtaining step; and presentation step of presenting the content and/or service associated with the respective display element selected at the display element selection step, based on the presentation data read at the reading step.

According to one aspect of the present invention, there is provided an information storage medium storing a program for causing a computer to function as display means for displaying images of a plurality of display elements associated with respective content sets and/or services; display element selection means for selecting one or more display elements from among the plurality of display elements, according to user operation; information obtaining means for obtaining information about the user or a provider of content and/or service associated with the respective display element selected by the display element selection means; reading means for reading one presentation data item from among a plurality of kinds of presentation data stored in presentation data storage means so as to be associated with the respective display element selected by the display element selection means, the one presentation data item being selected based on the information obtained by the information obtaining means; and presentation means for presenting the content and/or service associated with the respective display element selected by the display element selection means, based on the presentation data read by the reading means. Note that the computers include, e.g., contents players, personal computers, server computers, consumer game machines, commercial game machines, portable game machines, portable phones, and so forth. A program may be stored in various computer readable information storage media such as CD-ROM, DVD-ROM, and so forth.

According to the present invention, a plurality of display elements respectively associated with respective content sets and/or services are shown. One or more display elements are selected, and content and/or service associated with the selected element are presented. In the above, presentation of the content and/or service is made in a different manner according to information about the content and/or service provider or the user. As a result, according to the present invention, a user's interest in new content and/or service or one not used on a daily basis can be effectively aroused.

In one embodiment of the present invention, the display means may display an image of a space where the plurality of display elements are placed, the content and/or service presentation device may further comprise designated position moving means for moving by the user a designated position in the space, and the display element selection means may select one or more display elements from among the plurality of display elements, based on the designated position.

With the above, the image of a space where a plurality of display elements respectively associated with the content sets and/or services are placed can be displayed, and a user can move the designated position in the space. Then, one or more display elements are selected based on the position designated by the user, and associated content and/or service are presented. That is, one or more content sets and/or services are presented in response to the movement of the designated position by the user, even without deliberately instructing execution of the content and/or service.

In one embodiment of the present invention, the presentation data storage means may store the plurality of kinds of presentation data for presenting content and/or service associated with each display element, so as to be associated with the respective display element, together with use condition thereof, and the reading means may read the presentation data stored in the presentation data storage means, together with the use condition satisfied by the information obtained by the information obtaining means among the use conditions stored in the presentation data storage means so as to be associated with the respective display element selected by the display element selection means.

In one embodiment of the present invention, the presentation means may output an image and/or sound associated with the content and/or service associated with the respective display element selected by the display element selection means, based on the presentation data read by the reading means. The image may be a motion image or a static image, and is preferably shown in the position of the display element associated therewith.

In one embodiment of the present invention, the information obtaining means may obtain information sent from the provider of the content and/or service associated with the respective display element selected by the display element selection means. This information may be, e.g., information designating a manner of presentation of content and/or service or information describing a situation (e.g., use frequency) in which the content and/or service is used by another user. In this embodiment, content and/or service presentation in conformity with the intention of the provider of the content and/or service can be achieved.

In one embodiment of the present invention, the information obtaining means may obtain information produced based on a situation in which the user uses the content and/or service. This information may be information describing, e.g., content owned by a user, content use history for a user, service use history for a user, and so forth. In this embodiment, presentation in conformity with the user's taste can be achieved.

In one embodiment of the present invention, the information obtaining means may obtain information produced according to movement of the designated position by the designated position moving means. With the above, presentation in conformity with the user's current interest can be achieved.

In one embodiment of the present invention, the presentation means, for at least one display element, may carry out presentation of the content and/or service, based on the presentation data selected from among the plurality of kinds of presentation data, based on numbers of times presentation has been made using the respective plurality of kinds of presentation data associated with the display element, and a number of times the content and/service is provided in response to the presentation, in lieu of the presentation data read by the reading means. With the above, content and/or service can be presented to a user with higher probability of providing the content and/or service actually in response to the presentation.

DETAILED DESCRIPTION OF THE INVENTION

In the following, one embodiment of the present invention will be described in detail with reference to the accompanying drawings.

Figure 1:
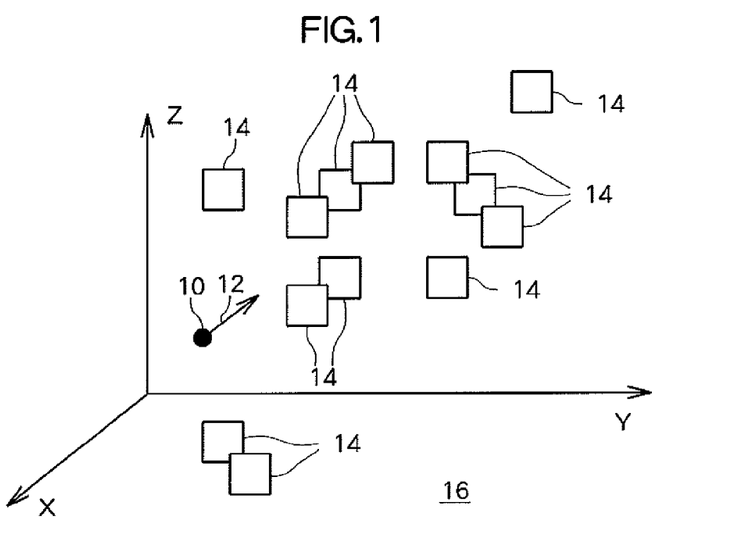
FIG. 1 is a diagram schematically showing a space where a display element associated with content/service is placed.

FIG. 1 schematically shows a virtual three dimensional space created in a memory of a presentation device according to one embodiment of the present invention. As shown, a plurality of display elements 14 are placed in the virtual three dimensional space 16, each associated with content or service and including, e.g., a static image in relation to the content or service. A position 10 designated by a user (designated position 10) and a direction 12 designated by the user (designated direction 12) are set in the virtual three dimensional space 16. A situation in the virtual three dimensional space 16 with the designated position 10 as a viewpoint and the designated direction 12 as a viewing direction is put into an image and shown on a monitor. That is, an image showing a picture obtained by viewing the virtual three dimensional space 16 from the designated position 10 in the designated direction 12 is produced and shown on the monitor.

Figure 2:
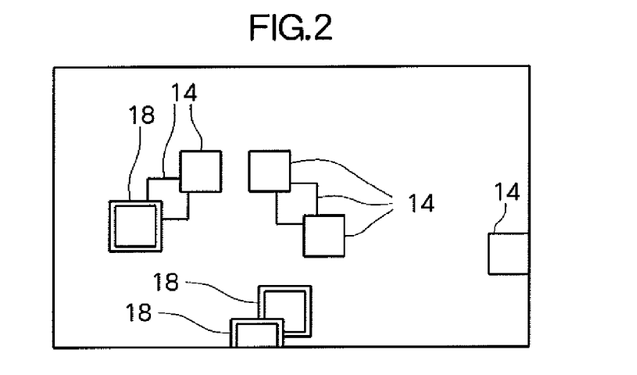
FIG. 2 is a diagram showing one example of a display screen image.

FIG. 2 shows one example of an image shown on the monitor. As shown, the image includes some of the display elements 14 placed in the virtual three dimensional space 16. A display element 14 located within a focused area (not shown) defined ahead (on the designated direction 12 side) of the designated position 10 in the virtual three dimensional space 16 is not shown, but a presentation image 18 is shown instead. The presentation image 18 is a motion image showing contents of the content or service associated with the display element 14 located in the same position as where the presentation image 18 is located. The motion image may be a motion image showing a part or the entirety of the contents of the content or service or a different motion image. The presentation device according to this embodiment has an input device for use by a user to desirably move the designated position 10 in the virtual three dimensional space 16 and change the designated direction 12. That is, it is possible to move, by pressing a specific button, the designated position 10 in a direction corresponding to the button in the virtual three dimensional space 16, and to turn, by pressing another specific button, the designated direction 12 in a direction corresponding to the button in the virtual three dimensional space 16. Presentation images 18 respectively corresponding to some (e.g., a predetermined number) or all of the display elements 14 within the focus area are shown on the monitor. In the above, announcement sounds corresponding to the respective display elements 14 may be additionally output. With the above, the user, by simply changing the designated position 10 and designated direction 12, can convert the display element located ahead of the designated position 10 into a presentation image 18, and thereby know the contents of the content and service associated with the display element 14.

Further, in this embodiment, a plurality of kinds of presentation approach are available, so that one of the plurality of kinds of presentation approach is selected according to information (status information) about a user or a content/service provider, and that presentation is made in the selected manner. That is, presentation is made in a different manner depending on the situation of the user or provider so that the user is not bored.

Figure 3:
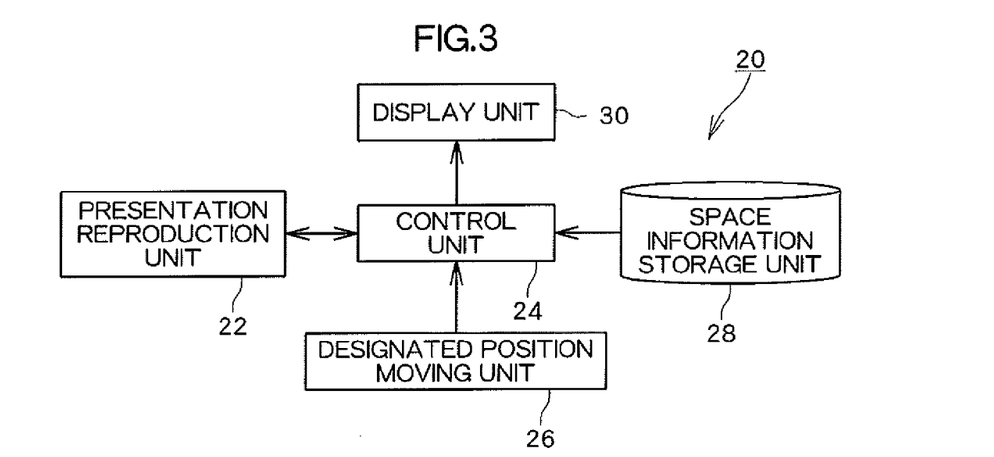
FIG. 3 is a functional block diagram showing a content and/or service presentation device according to one embodiment of the present invention.
Figure 4:
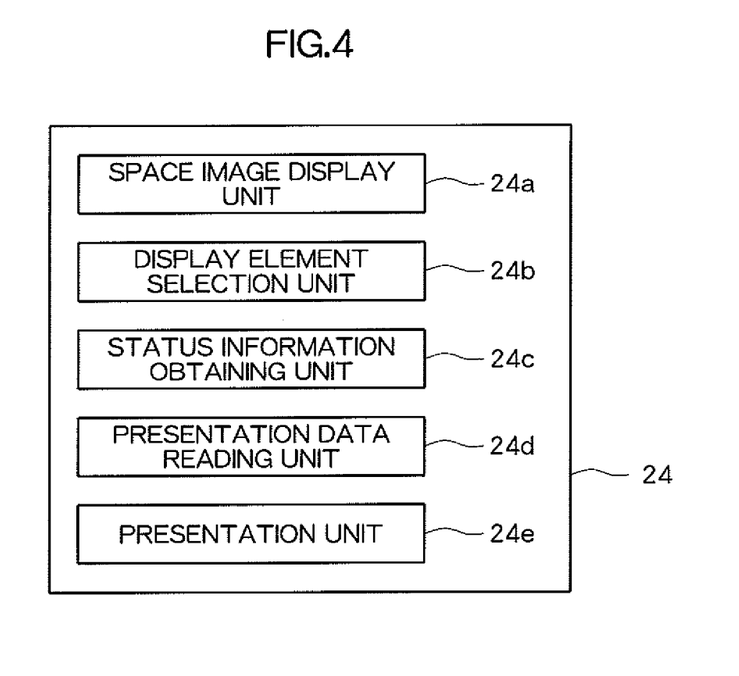
FIG. 4 is a diagram showing a structure of a control unit.

FIG. 3 is a functional block diagram showing a presentation device according to this embodiment. As shown, the presentation device 20 comprises a presentation reproduction unit 22, a control unit 24, a designated position moving unit 26, a space information storage unit 28, and a display unit 30. As shown in FIG. 4, the control unit 24 comprises a space image display unit 24a, a display element selection unit 24b, a status information obtaining unit 24c, a presentation data reading unit 24d, and a presentation unit 24e. These elements are realized by a computer, such as a contents player, a personal computer, a consumer game machine, and so forth, by executing a program. The program may be stored in a computer readable information storage medium, such as, e.g., CD-ROM, DVD-ROM, or the like, and installed from the medium into the computer.

The designated position moving unit 26 comprises a joystick, a PAD, a game controller, and so forth, for use by a user to desirably move the designated position 10 or change the designated direction 12 in the virtual three dimensional space 16. The control unit 24 produces an image of the virtual three dimensional original image 16, or a space image, according to the current designated position 10 and designated direction 12, and causes the produced image to be displayed on the display unit 30. In production of the space image, the control unit 24 refers to the contents stored in the space information storage unit 28. Note that to show the presentation image 18 instead of the display element 14, as described above, the presentation reproduction unit 22 produces the presentation image 18.

Figure 5:
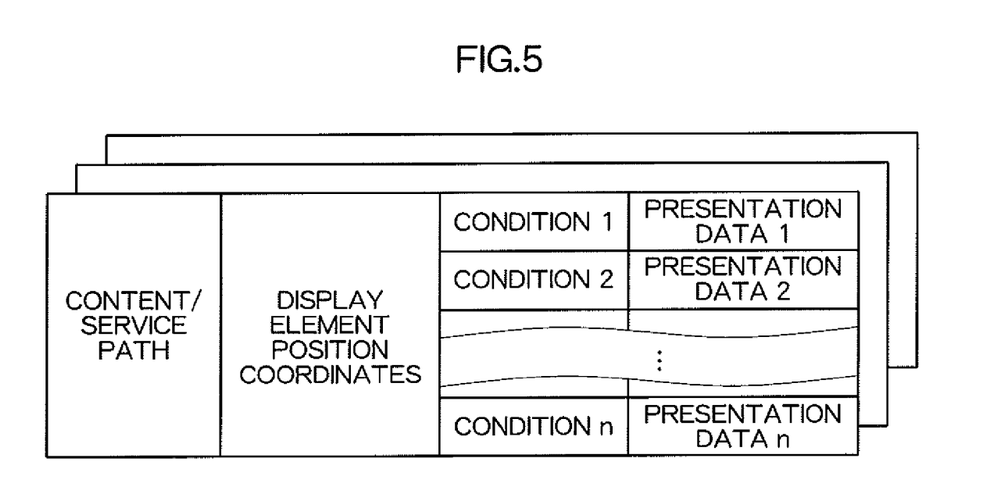
FIG. 5 is a diagram showing contents stored in a space information storage unit.

The space information storage unit 28 stores information about the virtual three dimensional space 16. Specifically, as shown in FIG. 5, the space information storage unit 28 stores, for each content/service, a path to reproduce the content or to use the service, position coordinates (display element position coordinates) at which to display the display element 14 associated with the content/service in the virtual three dimensional space 16, and a plurality of kinds of presentation data, all so as to be associated with one another. The presentation data is data necessary to present to a user the contents of content/service, the data including, e.g., motion image data, static image data, music data, image (a combination between motion image and sound) data all about the contents of the content/service, or a program for outputting a motion image, a static image, sound, or an image. A use condition is stored in the respective presentation data so as to be associated therewith. The use condition concerns conditions for presenting content and service, based on the presentation data associated with the use condition. With a presentation device incorporated in a contents player, containing specific content in content reproduced by the contents player, in the fact that reproduced content contains a predetermined number of or more content sets of predetermined kinds, and so forth, can be used as the use condition. Besides, containing specific content in content owned by a user, containing a specific kind of service in a user's service use history, the barycenter in the virtual three dimensional space 16, of the positions of display elements 14 associated with all content sets owned by the user, being within a predetermined range, and so forth may be used as the use condition. Further, a condition concerning a path (a movement path) along which the designated position 10 moves in the virtual three dimensional space 16 may be used as the use condition. Still further, presence of a use request from a content provider may be used as a use condition. Also, some or all of the use conditions stored in the space information storage unit 28 may be desirably changed by the provider of content/service corresponding to the use condition. For example, a request may be sent to the provider side device at any time via a communication network to download therefrom the latest use condition to be associated with the respective presentation data.

The display element selection unit 24b of the control unit 24 reads, from the space information storage unit 28, the display element position coordinates associated with the respective content sets/services, and selects therefrom one located within a focus area defined based on the current designated position 10 and designated direction 12. Then, some (e.g., a predetermined number of coordinates, beginning with the ones closest to the designated position 10) or all of the position coordinates located within the focus area are selected as presentation targets.

The status information obtaining unit 24c obtains, as status information, information about the user or the provider of content/service associated with the display element 14 which is a presentation target. Information about a provider is information sent from the provider to the presentation device 20 via, e.g., a communication network, in which the information may contain designation of presentation data to be used by a content/service provider when presenting the content/service. Information about a user is produced based on a situation in which the user uses content/service in the presentation device 20. With a presentation device incorporated in a contents player, the content or the like reproduced by the contents player or the like can be used as the information. Further, e.g., content owned by a user or a user or service use history for a user may be used. Information about a user may also be information about a path along with the designated position 10 has moved in the virtual three dimensional space 16 or information about the user's age (information about age or age group).

The presentation data reading unit 24d reads all of the use conditions stored in the space information storage unit in association with the display element 14 selected as a presentation target by the display element selection unit 24b. Then, a use condition satisfied by the status information obtained by the status information obtaining unit 24c is selected therefrom, and presentation data associated with the use condition is read from the space information storage unit 28. Then, the read presentation data is provided to the presentation reproduction unit 22, while instructing to begin production of the presentation image 18 and/or announcement sound.

The presentation reproduction unit 22 produces a presentation image 18 and announcement sound, based on the presentation data supplied from the control unit 24, and forwards to the control unit 24. The presentation unit 24e, having obtained the presentation image 18 and announcement sound, places the presentation image 18 in the position where the display element 14 associated with the presentation image 18 is located in the virtual three dimensional space 16, and outputs the announcement sound via the speaker (not shown).

The space image display unit 24a produces an image of the virtual three dimensional space 16 where the presentation image 18 is thus placed, and causes display on the display unit 30 comprising a monitor such as a CRT, an LCD, or the like.

If the display element position coordinates of the content/service with respect to which the presentation image 18 and announcement sound are currently output come to be no longer included in the focus area in the virtual three dimensional space 16 due to movement of the designated position 10 and/or change of the designated direction 12, the presentation unit 24e stops displaying of the presentation image 18 and/or outputting of the announcement sound.

Figure 6:
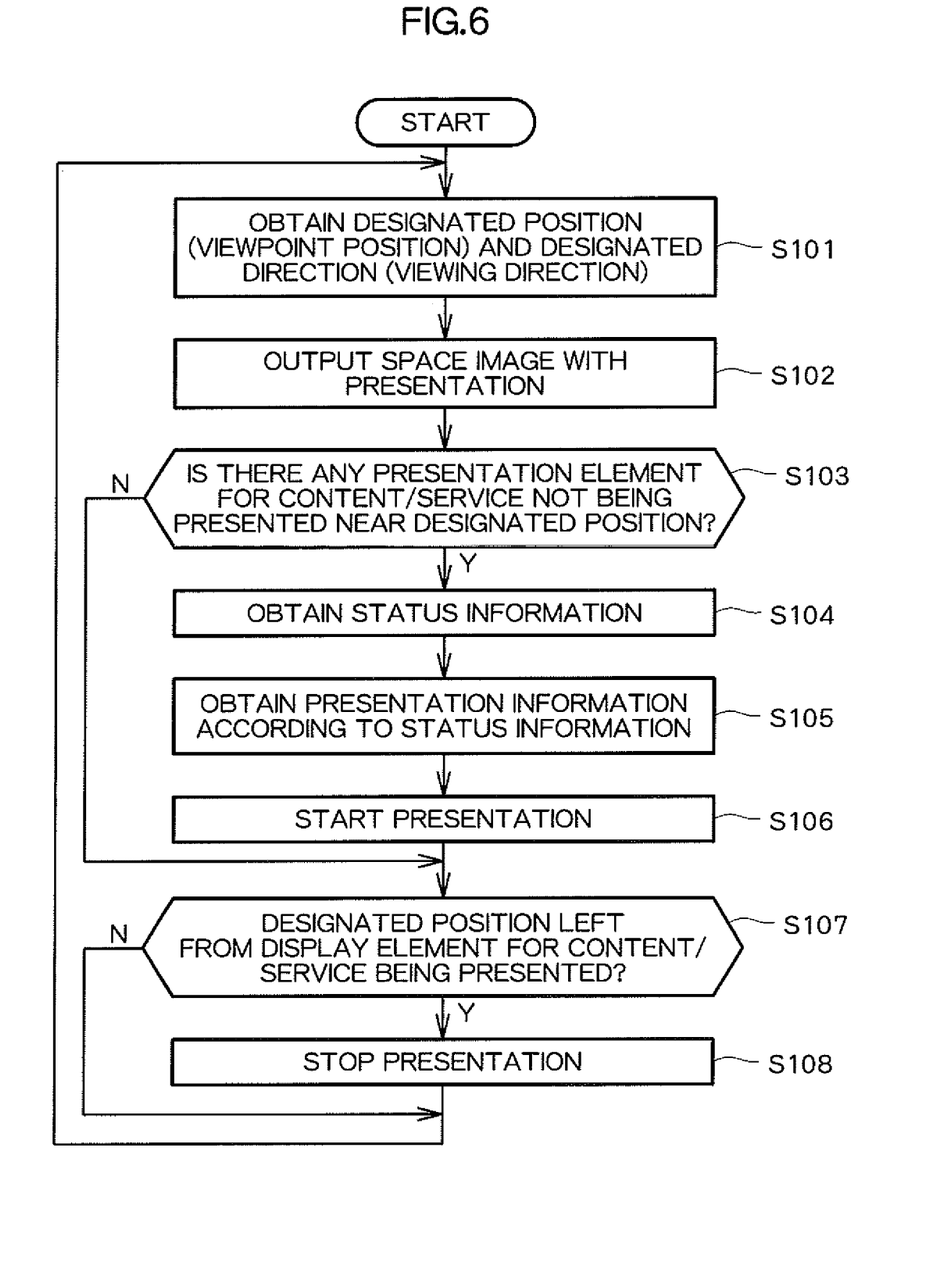
FIG. 6 is a flowchart of an operation of the control unit of a content and/or service presentation device according to one embodiment of the present invention.

FIG. 6 is a flowchart of an operation of the control unit 24. As shown, the control unit 24 initially obtains the current designated position 10 and designated direction 12 from the designated position moving unit 26 (S101), then produces an image (a space image) showing a picture obtained by viewing, from the designated position 10 in the designated direction 12, the virtual three dimensional space 16 where the display element or presentation image 18 is placed in the display element position coordinates stored in the space information storage unit 28, and outputs to the display unit 30 (S102). In the above, if announcement sound is available as produced by the presentation reproduction unit 22, the announcement sound is output via the speaker.

Thereafter, whether or not there are any display element position coordinates newly included in a focus area defined based on the current designated position 10 and designated direction 12 is determined (S103). Then, if there are any such display element position coordinates, the status information obtaining unit 24c obtains status information (S104), and then reads, from the space information storage unit 28, presentation data associated with the condition satisfied by the status information and associated with the display element position coordinates newly included in the focus area (S105). Then, the presentation data is supplied to the presentation reproduction unit 22, while instructing to begin production of the presentation image 18 and/or announcement sound (S106). Meanwhile, if there are no such display element position coordinates newly included in the focus area defined based on the current designated position 10 and designated direction 12 (S103), the processes at S104 to S106 are skipped.

Thereafter, when the display element position coordinates of the content/service with respect to which the presentation image 18 or announcement sound is currently produced by the presentation reproduction unit 22 are outside the focus area (S107), the presentation unit 24e of the control unit 24 instructs the presentation reproduction unit 22 to stop current production of the presentation image 18 and announcement sound (S108), and the above described processes (S101 to S108) are repeated for every predetermined period of time. Meanwhile, if the display element position coordinates of the content/service with respect to which the presentation image 18 or announcement sound is currently produced by the presentation reproduction unit 22 remains within the focus area (S107), the process at S108 is skipped.

According to the above described embodiment, upon desirable change by the user of the designated position 10 and designated direction 12, presentation of the content and service begins. That is, the contents of content or service is automatically presented even without deliberate execution by a user of any specific operation to produce the content or begin the service. This arrangement can effectively arouse the user's interest in the content and service. Also, as a presentation image and announcement sound is output as presentation of content in a manner in conformity with the status information about the user or content provider, the user can freshly receive the presentation all the time without being bored. As a result, more efficient presentation of content and service can be achieved.

Note that the above described embodiment can be modified in various manners. For example, information about the virtual three dimensional space 16 and presentation data is not necessarily stored in the presentation device 20, but may be stored in another computer connected via a communication network.

Figure 7:
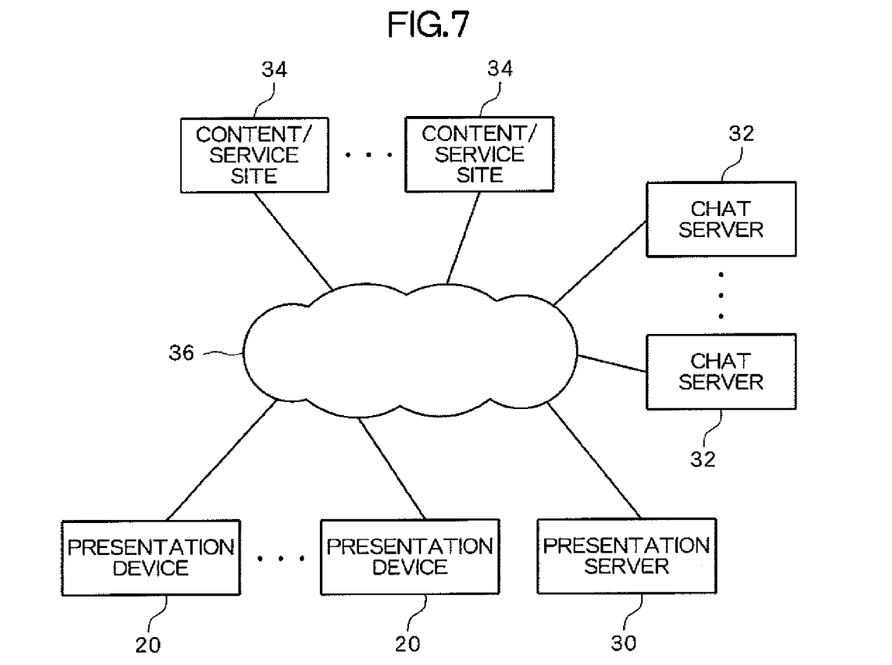
FIG. 7 is a diagram showing a complete structure of a presentation system to which the content and/or service presentation device is applied.

FIG. 7 shows a complete structure of a presentation system according to a modified example. As shown, in this system, a plurality of presentation devices 20 are connected to the communication network 36, such as the Internet, or the like. In addition, the presentation server 30, a plurality of chat servers 32, and a plurality of content/service sites 34, are also connected to the communication network 36.

Figure 8:
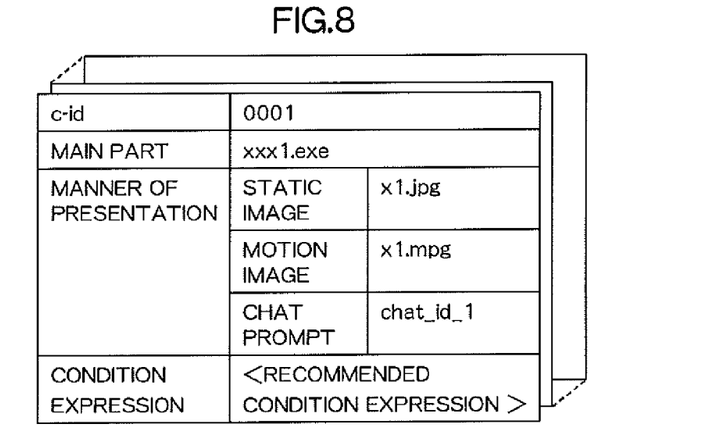
FIG. 8 is a diagram schematically showing a history table stored in the presentation device.

The content/service site 34 is formed mainly using a server computer, storing a program and data about content and service. In the presentation device 20, when a user designates one presentation image 18, using a cursor or the like, to thereby designate use of content/service associated with the presentation image 18, a request for the content/service is sent to the content/service site 34. The content/service site 34, in response to the request, sends data of the content to the presentation device 20 or executes the service program and sends the execution result, to thereby provide the content/service. The content/service site 34 stores a plurality of kinds of presentation data and a presentation table shown in FIG. 8. The presentation table is used as basic information for use in selectively providing presentation data to the presentation device 20, and stores identification information (c-id) of content/service, information (an address, a file name, and so forth) specifying content main part data, information (an address, a file name, and so forth) specifying each of the plurality of kinds of presentation data, and a condition expression (a recommended condition expression) for selecting one of the plurality of kinds of presentation data, all so as to be associated with one another. In the presentation device 20, with any display element position coordinates newly included in the focus area while the space image is shown, a presentation table associated with the coordinates is received, when necessary, and a method of presentation to apply is selected by reference to the presentation table. With a presentation method selected in the presentation device 20, associated presentation data is downloaded from the content/service site 34.

The chat server 32 is also formed mainly using the server computer, to which a plurality of presentation devices 20, or computers, are connected to exchange messages input by the respective users among the respective presentation devices 20. With the above, the user can enjoy chatting. According to the present presentation system, a dedicated chat service is available for some of the content/services to be presented to the user, so that the users can chat about comments on a specific content/service. According to the modified example, a chat prompt, or an input form for sending a transmission message according to the chat service, is displayed as presentation of content/service, so that a user's interest in the content/service is aroused through chatting.

Figure 9:
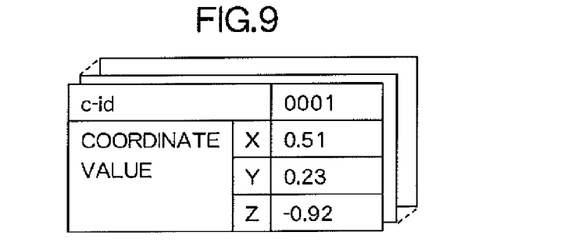
FIG. 9 is a diagram schematically showing a presentation table stored in a content/service site.

The presentation server 30 is also formed mainly using the server computer, and stores information about the virtual three dimensional space 16, shown in FIG. 9, or the space information, and distributes information about the space in a range necessary to display the space information in the respective presentation devices 20 in response to requests from the respective presentation devices 20. Further, the presentation server 30 collects history about presentation and use of content/service carried out in the respective presentation devices 20. Based on such data, the presentation server 30 determines what content/service is popular now, which presentation data is effective when the service/content is presented, and so forth, and notifies the respective presentation device 20 of the result of determination, for presentation of content/service.

Figure 10:
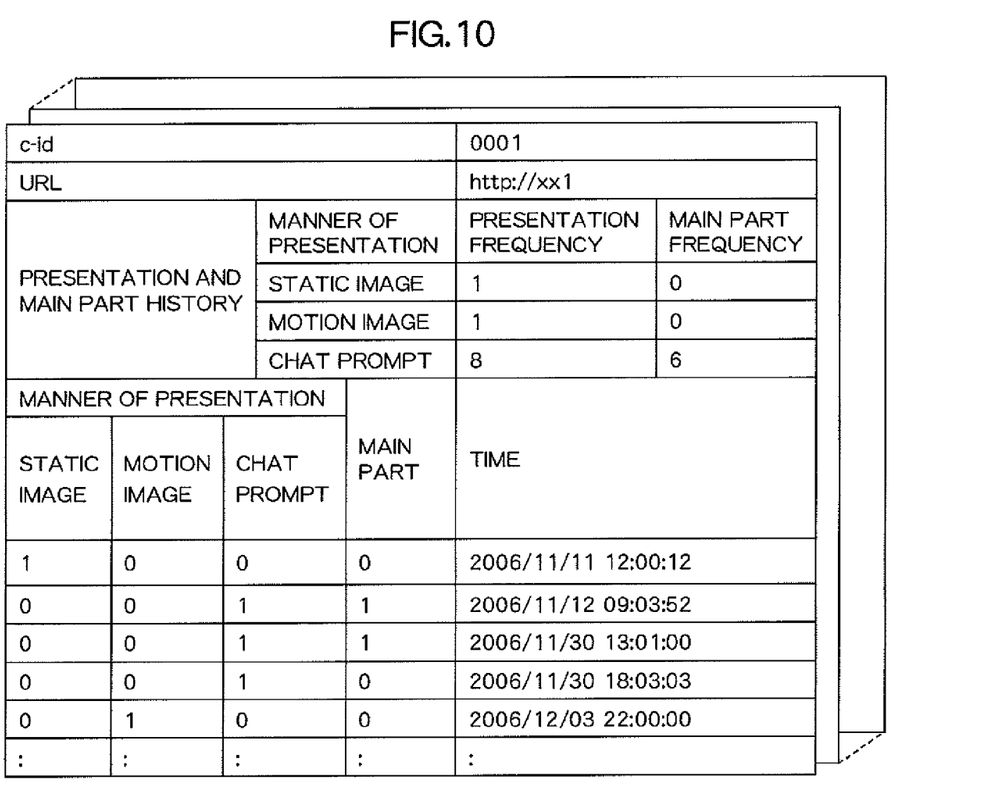
FIG. 10 is a diagram schematically showing space information stored in a presentation server.

In the modified example, the presentation device 20 records in the history table, information about which content/service is presented, which kind of presentation data is used when making the presentation, when the presentation is made, and whether or not the user instructs to use the content/service (reproduction operation and so forth) upon the presentation, and so forth. FIG. 10 schematically shows contents of the history table. As shown, the history table is stored for each content/service, and shows identification information and location (URL) of content/service. The history table also shows (in the lower part of the table), for every presentation, a record (presentation and use record) concerning a time at which the presentation is made, flags (a presentation method flag) each indicating the kind (MANNER OF PRESENTATION) of presentation data used, and a flag (a use-or-not flag) indicting whether or not the user instructs to use the main part of the content/service when making the presentation. The detailed record of the history table, in particular, is sent to the presentation server 30 every fixed period of time.

Further, for each of the plurality of kinds of presentation data (static image, motion picture, chat prompt), the number of times a presentation is made using data of that kind (presentation frequency) and the number of times use of content/service is instructed when making the presentation (main part frequency) are also described as status information.

Figure 11:
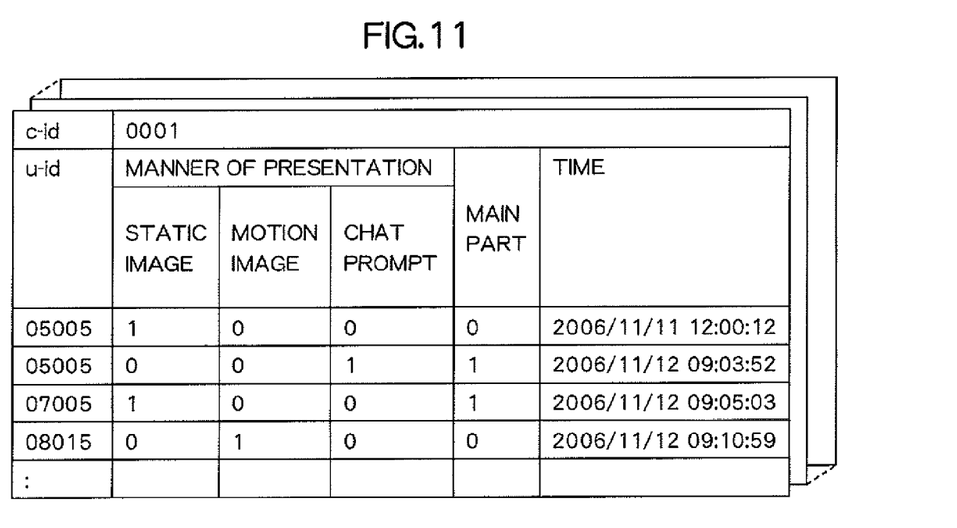
FIG. 11 is a diagram schematically showing a history table stored in the presentation server.
Figure 12:
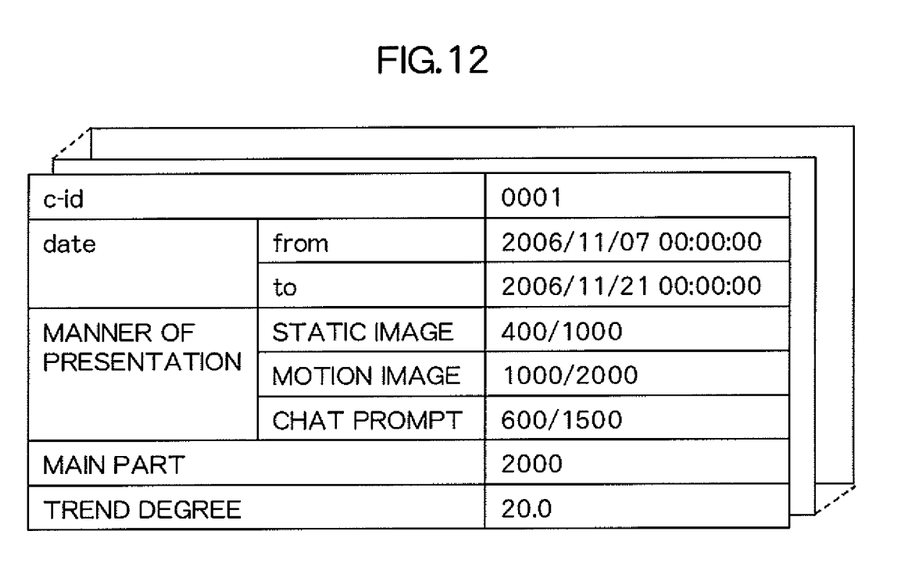
FIG. 12 is a diagram schematically showing trend data produced in the presentation server.

The presentation server 30 receives presentation and use records from the respective presentation devices 20 and collects for every content/service, as shown in FIG. 11. Then, based on the data shown in FIG. 11, the number of times content/service is presented during the last two weeks and the number of times use of content/service is instructed when making the presentation during the same period are counted for each content/service, and a value obtained by dividing the latter by the former, that is, a use instruction rate, or probability with which a use instruction will be made when making a presentation, are stored, as shown in FIG. 12.

In addition, the sum of use instructions made with respect to each content/service is calculated, and the obtained value is divided by the maximum one of the sums of the use instructions made with respect to the respective content/services, followed by multiplication by 100, to thereby calculate a trend degree. For example, suppose that the maximum one of the number of times a use instruction is actually issued to provide contents/services in response to the presentation is 10000. In the above, the trend degree of content/service with the sum being 2000 is 20.0 (=2000/10000×100). It should be noted that, for content/service with the trend degree in excess of a predetermined value, the presentation server 30 instructs the presentation device 20 to use presentation data of a kind which results in the maximum use instruction rate, when necessary.

In a system according to the modified example, in obtaining status information at S104 in FIG. 6, the presentation device 20 obtains status information contained in the history table shown in FIG. 10. Further, in selection of presentation data in accordance with the status information (the process at S105 in FIG. 6), presentation data in conformity with the status information is selected according to an algorithm stored beforehand in the presentation device 20. For example, presentation data having the value obtained by dividing the main part frequency by the presentation frequency being equal to or larger than a predetermined value may be selected. When two or more such presentation data are available, presentation data with the value largest among those is selected. When no such presentation data is available, on the other hand, the above described recommended condition expression is received from the content/service site 34, and presentation data is selected according to the condition expression. For example, where the recommended condition expression contains designation of presentation data, such as "for a user having used any content/service, use motion picture presentation data" or the like, the designated presentation data is selected when the condition is satisfied. Meanwhile, when the condition is not satisfied, an inquiry is made to the presentation server 30 as to whether or not any presentation data is designated. The presentation server 30, in response to the inquiry, informs the presentation device 20 of presentation data of a kind resulting in the maximum use instruction rate, which is determined with respect to content/service with the trend degree thereof in excess of a predetermined value, as described above. The presentation device 20, having been informed as above, presents the content/service, using the presentation data informed. When no trend value exceeds a predetermined value, the kind of presentation data to use is determined based on a random number.

With the above as well, effective content/service presentation can be achieved. In particular, selection of the kind of presentation data, based on the use instruction rate, can increase the possibility of the user using the content/service when making the presentation. Note that the respective presentation data may contain data indicating various effects, such as blinking or color change of some or all images, to be applied to a motion image or static image.

The invention claimed is:

1. A content and/or service presentation device, comprising:
   display means for displaying a plurality of display elements within a virtual three-dimensional (3-D) space, each display element being associated with, and representative of, a respective content set and/or service, and each display element being a static image;
   display element selection means for selecting two or more display elements among the plurality of display elements that are displayed in the virtual 3-D space, according to a user specification of a point of view and a direction of view into the virtual 3-D space, wherein the point of view and direction of view define a focus area within the 3-D space that establishes the selected display elements within such focus area and allowing the user to adjust the selected display elements by adjusting the point of view and direction of view to adjust the focus area;
   information obtaining means for obtaining information about the user or a provider of content and/or a service associated with the respective two or more display elements selected by the display element selection means;
   presentation data storage means for storing a plurality of kinds of presentation data for each of the plurality of display elements, each presentation data item differing in kind from the respective display element and corresponding to respective information about the user or provider of content and/or services associated with the respective display element, and each display element being stored in association with a respective plurality of presentation data;

reading means for selecting and reading one presentation data item from among the respective plurality of presentation data stored in the presentation data storage means in association with each selected display element based on the information obtained by the information obtaining means, such that each selected presentation data item is associated with the respective display element selected by the display element selection means; and presentation means for presenting each of the plurality of presentation data selected and read by the reading means within the virtual 3-D space in place of each respective associated display element selected by the display element selection means, while the remaining plurality of display elements are also displayed.

2. The content and/or service presentation device according to claim 1, wherein the content and/or service presentation device further comprises designated position moving means for allowing the user to move the point of view and the direction of view within the virtual 3-D space.

3. The content and/or service presentation device according to claim 2, wherein the presentation data storage means stores the plurality of kinds of presentation data for presenting content and/or service associated with each display element, so as to be associated with the respective display element, together with a use condition thereof, and the reading means reads the presentation data stored in the presentation data storage means, together with the use condition satisfied by the information obtained by the information obtaining means among the use conditions stored in the presentation data storage means so as to be associated with the respective display element selected by the display element selection means.

4. The content and/or service presentation device according to claim 2, wherein the information obtaining means obtains information produced according to movement of the point of view and the direction of view in the virtual 3-D space by the designated position moving means.

5. The content and/or service presentation device according to claim 1, wherein the presentation means outputs an image and/or sound associated with the content and/or service associated with the respective display element selected by the display element selection means, based on the presentation data read by the reading means.

6. The content and/or service presentation device according to claim 1, wherein the information obtaining means obtains information sent from the provider of the content and/or service associated with the respective display element selected by the display element selection means.

7. The content and/or service presentation device according to claim 1, wherein the information obtaining means obtains information produced based on a situation in which the user uses the content and/or service.

8. The content and/or service presentation device according to claim 1, wherein the presentation means, for at least one display element, carries out presentation of the content and/or service, based on the presentation data selected from among the plurality of kinds of presentation data, based on numbers of times presentation has been made using the respective plurality of kinds of presentation data associated with the display element, and a number of times the content and/service is provided when making the presentation, in lieu of the presentation data read by the reading means.

9. A content and/or service presentation method, comprising:

displaying a plurality of display elements within a virtual three dimensional (3-D) space, each display element being associated with, and representative of, a respective content set and/or service, and each display element being a static image;

selecting two more display elements among the plurality of display elements that are displayed in the virtual 3-D space, according to a user specification of a point of view and a direction of view into the virtual 3-D space, wherein the point of view and direction of view define a focus area within the 3-D space that establishes the selected display elements within such focus area and allowing the user to adjust the selected display elements by adjusting the point of view and direction of view to adjust the focus area;

obtaining information about the user or a provider of content and/or a service associated with the respective two or more display elements selected at the display element selection step;

storing a plurality of kinds of presentation data for each of the plurality of display elements, each presentation data item differing in kind from the respective display element and corresponding to respective information about the user or provider of content and/or services associated with the respective display element, and each display element being stored in association with a respective plurality of presentation data;

selecting and reading one presentation data item from among the respective plurality of presentation data stored in association with each selected display element based on the information obtained at the information obtaining step, such that each selected presentation data item is associated with the respective display element selected at the display element selection step; and presenting each of the plurality of presentation data selected and read at the selecting and reading step within the virtual 3-D space in place of each respective associated display element selected at the display element selection step, while the remaining plurality of display elements are also displayed.

10. A computer readable, non-transitory information storage medium storing a program for causing a computer to function as:

display means for displaying a plurality of display elements within a virtual three-dimensional (3-D) space, each display element being associated with, and representative of, a respective content set and/or service, and each display element being a static image;

display element selection means for selecting two more display elements among the plurality of display elements that are displayed in the virtual 3-D space, according to a user specification of a point of view and a direction of view into the virtual 3-D space, wherein the point of view and direction of view define a focus area within the 3-D space that establishes the selected display elements within such focus area and allowing the user to adjust the selected display elements by adjusting the point of view and direction of view to adjust the focus area;

information obtaining means for obtaining information about the user or a provider of content and/or a service associated with the respective two or more display elements selected by the display element selection means;

presentation data storage means for storing a plurality of kinds of presentation data for each of the plurality of display elements, each presentation data item differing in kind from the respective display element and corresponding to respective information about the user or provider of content and/or services associated with the respective display element, and each display element being stored in association with a respective plurality of presentation data;

reading means for selecting and reading one presentation data item from among the respective plurality of presentation data stored in the presentation data storage means in association with each selected display element based on the information obtained by the information obtaining means, such that each selected presentation data item is associated with the respective display element selected by the display element selection means; and presentation means for presenting each of the plurality of presentation data selected and read by the reading means within the virtual 3-D space in place of each respective associated display element selected by the display element selection means, while the remaining plurality of display elements are also displayed.

11. A content and/or service presentation device, comprising:

Display circuit operating to display a plurality of display elements within a virtual three-dimensional (3-D) space, each display element being associated with, and representative of, a respective content set and/or service, and each display element being a static image;

display element selection circuit operating to select two more display elements among the plurality of display elements that are displayed in the virtual 3-D space, according to a user specification of a point of view and a direction of view into the virtual 3-D space, wherein the point of view and direction of view define a focus area within the 3-D space that establishes the selected display elements within such focus area and allowing the user to adjust the selected display elements by adjusting the point of view and direction of view to adjust the focus area;

information obtaining circuit operating to obtain information about the user or a provider of content and/or a service associated with the respective two or more display elements selected by the display element selection circuit;

presentation data storage circuit operating to store a plurality of kinds of presentation data for each of the plurality of display elements, each presentation data item differing in kind from the respective display element and corresponding to respective information about the user or provider of content and/or services associated with the respective display element, and each display element being stored in association with a respective plurality of presentation data;

reading circuit operating to select and read one presentation data item from among the respective plurality of presentation data stored in the presentation data storage circuit in association with each selected display element based on the information obtained by the information obtaining circuit, such that each selected presentation data item is associated with the respective display element selected by the display element selection circuit; and presentation circuit operating to present each of the plurality of presentation data selected and read by the reading circuit within the virtual 3-D space in place of each respective associated display element selected by the display element selection circuit, while the remaining plurality of display elements are also displayed.

12. The content and/or service presentation device according to claim 11, further comprising designated position moving circuit operating to allow the user to move the point of view and the direction of view into the virtual 3-D space.

13. The content and/or service presentation device according to claim 12, wherein the information obtaining circuit obtains information produced according to movement of the point of view and the direction of view in the virtual 3-D space by the designated position moving circuit.

14. The content and/or service presentation device according to claim 11, wherein the presentation data storage circuit stores the plurality of kinds of presentation data for presenting content and/or service associated with each display element, so as to be associated with the respective display element, together with a use condition thereof, and the reading circuit reads the presentation data stored in the presentation data storage circuit, together with the use condition satisfied by the information obtained by the information obtaining circuit among the use conditions stored in the presentation data storage circuit so as to be associated with the respective display element selected by the display element selection circuit.

15. The content and/or service presentation device according to claim 11, wherein the presentation circuit outputs an image and/or sound associated with the content and/or service associated with the respective display element selected by the display element selection circuit, based on the presentation data read by the reading circuit.

16. The content and/or service presentation device according to claim 11, wherein the information obtaining circuit obtains information sent from the provider of the content and/or service associated with the respective display element selected by the display element selection circuit.

17. The content and/or service presentation device according to claim 11, wherein the information obtaining circuit obtains information produced based on a situation in which the user uses the content and/or service.

18. The content and/or service presentation device according to claim 11, wherein the presentation circuit, for at least one display element, carries out presentation of the content and/or service, based on the presentation data selected from among the plurality of kinds of presentation data, based on numbers of times presentation has been made using the respective plurality of kinds of presentation data associated with the display element, and a number of times the content and/service is provided when making the presentation, in lieu of the presentation data read by the reading circuit.

19. A computer readable, non-transitory information storage medium storing a program for causing a computer to function as:

display circuit operating to display a plurality of display elements within a virtual three-dimensional (3-D) space, each display element being associated with, and representative of, a respective content set and/or service, and each display element being a static image;

display element selection circuit operating to select two more display elements among the plurality of display elements that are displayed in the virtual 3-D space, according to a user specification of a point of view and a direction of view into the virtual 3-D space, wherein the point of view and direction of view define a focus area within the 3-D space that establishes the selected display elements within such focus area and allowing the user to adjust the selected display elements by adjusting the point of view and direction of view to adjust the focus area;

information obtaining circuit operating to obtain information about the user or a provider of content and/or a service associated with the respective two or more display elements selected by the display element selection circuit;

presentation data storage circuit operating to store a plurality of kinds of presentation data for each of the plurality of display elements, each presentation data item differing in kind from the respective display element and corresponding to respective information about the user or provider of content and/or services associated with the respective display element, and each display element being stored in association with a respective plurality of presentation data;

reading circuit operating to select and read one presentation data item from among the respective plurality of presentation data stored in the presentation data storage circuit in association with each selected display element based on the information obtained by the information obtaining circuit, such that each selected presentation data item is associated with the respective display element selected by the display element selection circuit; and presentation circuit operating to present each of the plurality of presentation data selected and read by the reading circuit within the virtual 3-D space in place of each respective associated display element selected by the display element selection circuit, while the remaining plurality of display elements are also displayed.

* * * * *